2,788,287
Patented Apr. 9, 1957

2,788,287

NON GELLING POLYAMIDE SOLUTIONS

Samuel Zweig, Chicago, Ill., assignor, by mesne assignments, to The Borden Company, New York, N. Y., a corporation of New Jersey No Drawing. Application August 16, 1954,
Serial No. 450,270

2 Claims. (Cl. 106—287)

This invention relates to polymers of aliphatic amines with unsaturated fatty acids, commonly referred to as polyamide resins. More particularly it relates to the preparing of non-gelling solutions of polyamide resins and compositions containing such resins. The condensation of polymerized unsaturated fatty acids such as dilinoleic acid with aliphatic diamines, such as ethylene-diamine has been shown to yield thermo-plastic polymers in the molecular weight range of about 1000 to 15,000. The preparation of one form of such resin known as Norelac has been described in Abstract Service for 1944, page A-18, 100 published by InterScience Publishing, Inc., New York, and New York and Plastics Newsletter, September 11, 1944 (Plastic No. 345) and in publications of the United States Department of Agriculture. "Norelac" is prepared from the dimerised fatty acids of soya-bean oil and ethylene diamine.

It has been found that such polyamide resins provide excellent adhesives for almost all materials including glass and aluminum being particularly useful in connection with printing, overprinting, and heat-sealing of flexible packaging films, such as polyethylene, cellophane, glassine, rubber hydrochloride and aluminum foil. In connection with such uses solutions of the resins are used to apply the coating films or to provide the inks.

However, it has been found that the solvents required for proper solution are extremely critical in nature. Thus, no single solvent is known but mixtures of solvents are required. It has been stated, for example, that a mixture of butyl alcohol, isopropyl alcohol and a liquid aliphatic or aromatic hydrocarbon will normally dissolve such polyamide resins. However, such solutions as have the proper solids and viscosity usually gel near 80° F. In accordance with this invention, I have provided novel solvent mixtures which will drop the gelling point to as low as 40° F. and yet provide high solids, low viscosity solution of either polyamide resins alone or polyamide resins modified by other compounding ingredients.

Much to my surprise and contrary to the teachings of the art of dissolving polyamide resin solutions I have found that incorporation of a small amount of water ranging from 0.1 percent up to about 6 percent with an aliphatic alcohol liquid hydrocarbon mixture will accomplish the objects of this invention. It should be noted that this result is surprising and contrary to the teachings of the art inasmuch as water by itself is a non-solvent for such resins and there is no teaching to indicate that any non-solvent, let alone water, would so depress the gelling point as to permit a high total solids, yet low viscosity stable solution. Technical Bulletin 11–1–1 of General Mills, Inc. (1954) for example does not disclose any single solvent for polyamide resins but suggests mixed solvents of butyl, isopropyl, alcohol or absolute ethyl alcohol with toluene xylene or mineral spirits as useful mixed solvents. This publication further notes that polyamide solutions tend to gel on standing at room temperature. The teachings of the prior art are apparently directed against the utilization of water in the solvent system and recognize the unsolved problem of gelling.

As an example of this invention 40 parts by weight of Norelac when dissolved in 30 parts of petroleum ether and 30 parts of isopropyl alcohol gives a solution which gels at 75° F. and has a viscosity of about 140 centipoises. However, when 6 parts of water is added to this solution, the gelling temperature drops to about 40° F. and the viscosity to about 125 centipoises. Inasmuch as commercial processes in which polyamide resins are useful are normally operated at temperatures of between 50° and 80° F. as, for example, a high speed printing press, solutions made in accordance with this invention can be safely used in such processes, whereas solutions made in accordance with the prior art would be unsuitable.

In the following examples "Polyamid 93" and "Polyamid 94" refer to commercial polyamide resins sold by General Mills, Inc. of Kankakee, Illinois, described in their Technical Bulletin 11–1–1 (1954) as being condensation products of polymerised unsaturated fatty acids and aliphatic amines. "Polyamid 93" and "94" have melting points in the range 105–115° C. Ingredients are given in parts by weight. "Santicizer No. 8" is liquid and is a mixture of ortho and para N-ethyl toluene sulfonamides. The "aliphatic hydrocarbon" referred to is an aliphatic liquid petroleum distillate of boiling point range 149–175° F. and a kauributanol value of 34.3. Viscosities were taken at 80° F.

*Example 2*

Without water:
    "Polyamid No. 93" or Norelac_____ 40
    Aliphatic hydrocarbon_____ 30
    Isopropyl alcohol_____ 30
        Viscosity, cp_____ 130
        Gelling temperature, ° F_____ 75

With Water:
    "Polyamid No. 93" or Norelac_____ 40
    Aliphatic hydrocarbon_____ 30
    Isopropyl alcohol_____ 30
    Water _____ 6
        Viscosity, cp_____ 125
        Gelling temperature, ° F_____ 40

*Example 3*

Without water:
    "Polyamid No. 94"_____ 40
    Aliphatic hydrocarbon_____ 30
    Isopropyl alcohol_____ 30
        Gelling temperature, °F_____ 74

With water:
    "Polyamid No. 94"_____ 40
    Aliphatic hydrocarbon_____ 30
    Isopropyl alcohol_____ 30
    Water _____ 4
        Gelling temperature, °F_____ 50

*Example 4*

Without water:
    "Polyamid No. 93"_____ 40
    Aliphatic hydrocarbon_____ 30
    Butyl alcohol_____ 30
        Viscosity, cp_____ 275
        Gelling temperature, °F_____ 75

With water:
    "Polyamid No. 93"_____ 40
    Aliphatic hydrocarbon_____ 30
    Butyl alcohol_____ 30
    Water _____ 6
        Viscosity, cp_____ 550
        Gelling temperature, °F_____ 42

Example 5

Without water:
- "Polyamid No. 93" _____ 40
- Aliphatic hydrocarbon _____ 30
- Isopropyl alcohol _____ 30
- "Santicizer No. 8" _____ 4
  - Viscosity, cp _____ 165
  - Gelling temperature, °F _____ 61

With water:
- "Polyamid No. 93" _____ 40
- Aliphatic hydrocarbon _____ 30
- Isopropyl alcohol _____ 30
- "Santicizer No. 8" _____ 4
- Water _____ 5
  - Viscosity, cp _____ 165
  - Gelling temperature, °F _____ 40

Example 6

Without water:
- "Polyamid No. 93" _____ 40
- Isopropyl alcohol _____ 30
- Toluol _____ 30
  - Viscosity, cp _____ 275
  - Gelling temperature, °F _____ 75

With water:
- "Polyamid No. 93" _____ 40
- Isopropyl alcohol _____ 30
- Toluol _____ 30
- Water _____ 6
  - Viscosity, cp _____ 600
  - Gelling temperature, °F _____ 40

Example 7

Without water:
- "Polyamid No. 94" _____ 50
- Aliphatic hydrocarbon _____ 25
- Isopropyl alcohol _____ 25
  - Viscosity, cp _____ 165
  - Gelling temperature, °F _____ 76

With water:
- "Polyamid No. 94" _____ 50
- Aliphatic hydrocarbon _____ 25
- Isopropyl alcohol _____ 25
- Water _____ 6
  - Viscosity, cp _____ 627
  - Gelling temperature, °F _____ 60

Example 8

Without water:
- "Polyamid No. 93" _____ 40
- Aliphatic hydrocarbon _____ 15
- Isopropyl alcohol _____ 45
  - Viscosity, cp _____ 175
  - Gelling temperature, °F _____ 75

With water:
- "Polyamid No. 93" _____ 40
- Aliphatic hydrocarbon _____ 15
- Isopropyl alcohol _____ 45
- Water _____ 4
  - Viscosity, cp _____ 175
  - Gelling temperature, °F _____ 56

With water:
- "Polyamid No. 93" _____ 40
- Aliphatic hydrocarbon _____ 15
- Isopropyl alcohol _____ 45
- Water _____ 6
  - Viscosity, cp _____ 165
  - Gelling temperature, °F _____ 56

The above examples are illustrative but not intended to be exhaustive. Thus, other liquid aliphatic or aromatic hydrocarbons, or mixtures of such hydrocarbons may be used, as for example, xylene, benzene, etc. Likewise, other liquid alcohols such as Cellosolve can be used.

The solvent mixtures of this invention may be used not only with the condensation products above but also with compositions of the condensation products containing waxes, plasticizers such as mixtures of ortho and para N-ethyl toluene sulphonamides, ester gums, chlorinated rubber, ethyl cellulose and nitro-cellulose.

The above examples of this invention have been directedly used to form heat sealable coatings for packaging films and to form colorless protective coatings over printed matter on transparent package films. Likewise the solutions have been modified to include dyes so as to form non-gelling printing inks which have been successfully applied in presses having speeds of 500 feet per minute.

It should be noted that for each particular solvent system a maximum water tolerance exists which if exceeded causes a slight separation of water. In the practise of this invention it is preferred that a product be designed for a particular maximum gelling temperature in terms of water content so as to achieve the sharp decrease in gelling temperature without incurring water phasing.

In the appended claims, the term "normally liquid" as applied to alcohols and hydrocarbons is intended in the usual sense to exclude those which are principally gaseous or solid at normal ambient temperatures (35 to 100 degrees Fahrenheit).

I claim:

1. A solution characterized as being non-gelling at ordinary temperatures and consisting of alkylene diamine polyamide of polymeric fat acids, normally liquid hydrocarbon, an alcohol selected from the group consisting of butyl alcohol, isopropyl alcohol and mixtures thereof and 0.1 to 6 percent of water based on total weight of solution.

2. A solution characterized as being non-gelling at ordinary temperatures and consisting of condensation products of dimerised soybean fatty acids with ethylene diamine, an alcohol selected from the group consisting of butyl alcohol, isopropyl alcohol and mixtures thereof, normally liquid hydrocarbon, and 0.1 to 6 percent of water based on the total weight of solution.

References Cited in the file of this patent

UNITED STATES PATENTS

| | | |
|---|---|---|
| 1,226,339 | Lindsey | May 15, 1917 |
| 2,430,987 | Lindner et al. | Nov. 18, 1947 |
| 2,550,682 | Falkenburg | May 1, 1951 |
| 2,575,170 | Holmes | Nov. 13, 1951 |
| 2,630,397 | Cowan et al. | Mar. 3, 1953 |
| 2,633,432 | Kenneway | Mar. 31, 1953 |
| 2,692,208 | Fisher | Oct. 19, 1954 |

OTHER REFERENCES

"Oil and Soap" of April 1944, pp. 101–107.